(12) United States Patent
Fankuchen

(10) Patent No.: US 9,930,841 B2
(45) Date of Patent: Apr. 3, 2018

(54) VERTICALLY ORIENTED COLLAPSIBLE HYDROPONIC PLANT PRODUCTION APPARATUS

(71) Applicant: Second Nature Aquaponics, LLC, Fullerton, CA (US)

(72) Inventor: Peter Adrian Fankuchen, Pomona, CA (US)

(73) Assignee: SECOND NATURE AQUAPONICS, LLC, Fullerton, CA (US)

( * ) Notice: Subject to any disclaimer, the term of this patent is extended or adjusted under 35 U.S.C. 154(b) by 87 days.

(21) Appl. No.: 14/823,998

(22) Filed: Aug. 11, 2015

(65) Prior Publication Data
US 2016/0037739 A1    Feb. 11, 2016

Related U.S. Application Data

(60) Provisional application No. 62/035,884, filed on Aug. 11, 2014.

(51) Int. Cl.
| | | |
|---|---|---|
| *A01K 9/00* | (2006.01) | |
| *A01G 31/02* | (2006.01) | |
| *A01G 9/02* | (2018.01) | |

(52) U.S. Cl.
CPC ............. *A01G 31/02* (2013.01); *A01G 9/025* (2013.01); *Y02P 60/216* (2015.11); *Y02P 60/244* (2015.11)

(58) Field of Classification Search
CPC .......... A01G 9/02; A01G 9/022; A01G 9/023; A01G 9/025; A01G 9/024
See application file for complete search history.

(56) References Cited

U.S. PATENT DOCUMENTS

| | | | |
|---|---|---|---|
| 4,218,847 A | 8/1980 | Leroux | |
| 4,255,896 A | 3/1981 | Carl | |
| 4,986,025 A | 1/1991 | Imperial | |
| 6,477,805 B2 | 11/2002 | Ware | |
| 7,080,482 B1 | 7/2006 | Bradley | |
| 7,818,919 B1 * | 10/2010 | Maxwell-Merrill | ... A01G 9/025 47/83 |
| 7,832,144 B2 | 11/2010 | Corradi | |
| 7,877,927 B2 | 2/2011 | Roy et al. | |
| 8,141,294 B2 | 3/2012 | Bribach et al. | |

(Continued)

FOREIGN PATENT DOCUMENTS

| | | | | |
|---|---|---|---|---|
| CA | 2779344 A1 * | 5/2011 | ............ | A01G 9/025 |
| CA | 2780261 A1 * | 5/2011 | ............ | A01G 9/025 |

(Continued)

*Primary Examiner* — Monica Williams
(74) *Attorney, Agent, or Firm* — Knobbe, Martens, Olson & Bear LLP

(57) ABSTRACT

Described is an apparatus that can be used for the vertically oriented culture of plants using soilless means such as aquaponics or hydroponics. The apparatus can include a plurality of pockets and a backing. Each pocket of the plurality of pockets can be used to house an individual plant. Each pocket of the plurality can have a water reservoir, an outlet hole at a top of the water reservoir and a channel along a front of the pocket configured to direct water from the outlet hole to another pocket or collection container below the pocket. The plurality of pockets can be connected to the backing in a column or other configuration.

17 Claims, 17 Drawing Sheets

(56) References Cited

U.S. PATENT DOCUMENTS

| | | | | |
|---|---|---|---|---|
| 8,234,814 | B2* | 8/2012 | Kertz | A01G 9/024 47/17 |
| 8,950,112 | B2 | 2/2015 | dos Santos | |
| 9,210,846 | B2* | 12/2015 | VanLente | A01G 9/022 |
| 2006/0032128 | A1 | 2/2006 | Bryan | |
| 2009/0000189 | A1* | 1/2009 | Black | A01G 27/02 47/82 |
| 2010/0024292 | A1* | 2/2010 | Kertz | A01G 9/024 47/17 |
| 2011/0215937 | A1* | 9/2011 | Carroll | A01G 9/02 340/604 |
| 2012/0066972 | A1* | 3/2012 | Lin | A01G 9/023 47/82 |
| 2013/0067814 | A1 | 3/2013 | Riley et al. | |
| 2013/0118074 | A1 | 5/2013 | Fulbrook | |

FOREIGN PATENT DOCUMENTS

| | | | |
|---|---|---|---|
| WO | WO 2011/016856 | 2/2011 | |
| WO | WO 2013014337 A2 * | 1/2013 | A01G 9/025 |

* cited by examiner

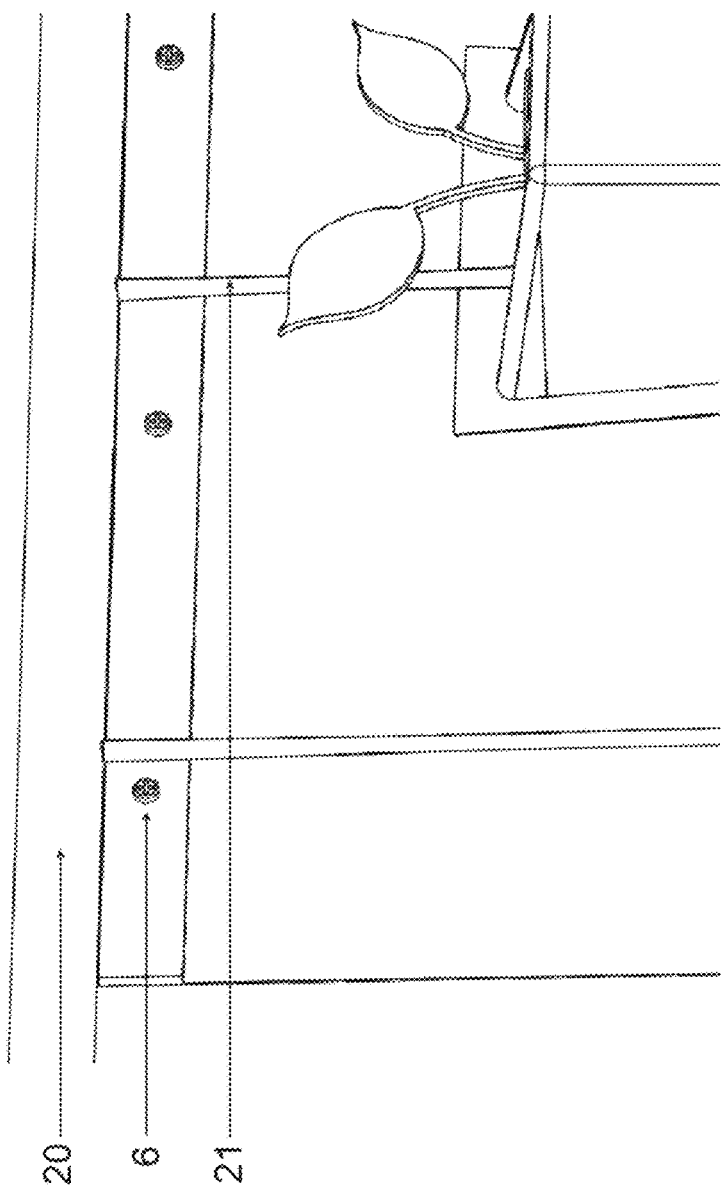

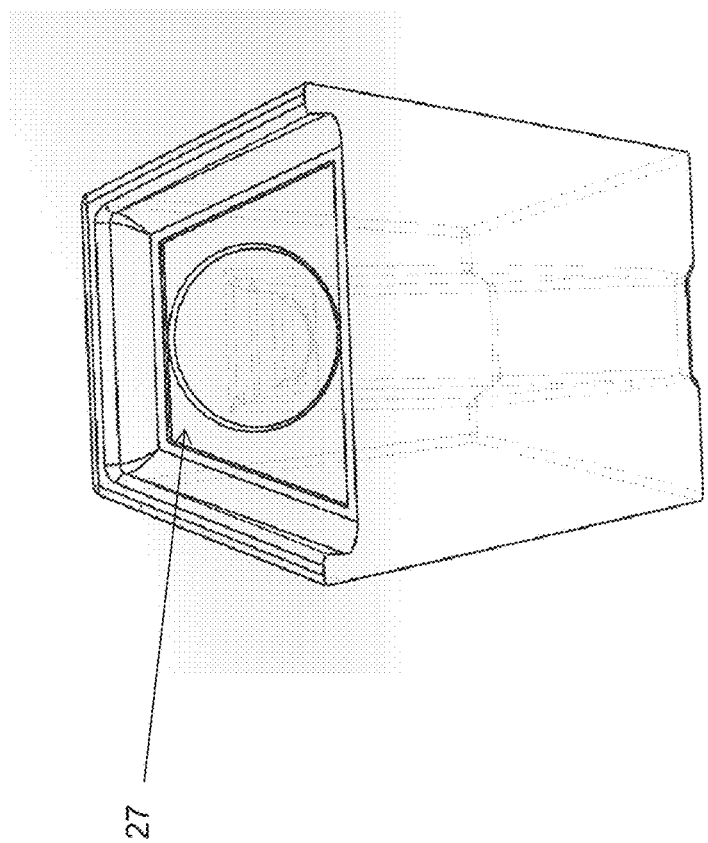

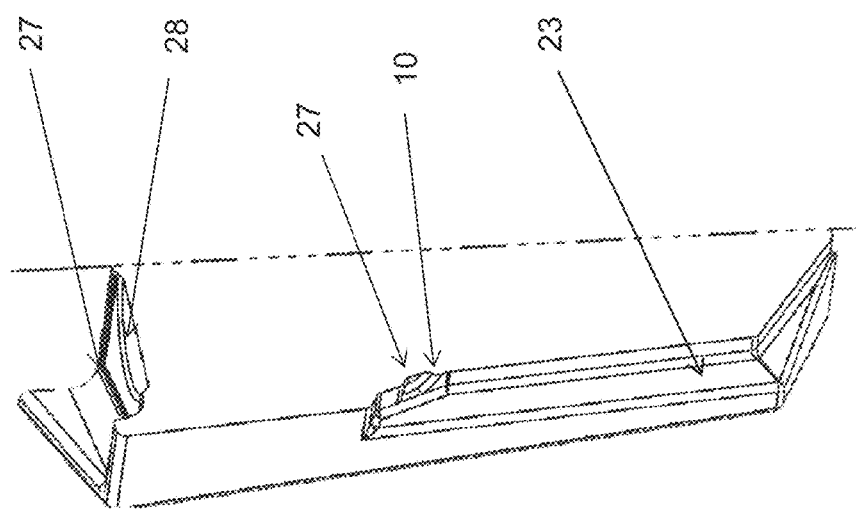

VERTICALLY ORIENTED COLLAPSIBLE HYDROPONIC PLANT PRODUCTION APPARATUS

CROSS-REFERENCE TO RELATED APPLICATIONS

This application claims priority to U.S. Provisional Appl. No. 62/035,884, filed Aug. 11, 2014. The entire contents of the above-application is hereby incorporated by reference and made a part of this specification. Any and all priority claims identified in the Application Data Sheet, or any correction thereto, are hereby incorporated by reference under 37 CFR 1.57.

BACKGROUND OF THE INVENTION

Field of the Invention

The described device pertains to the hydroponic cultivation of plants, and more specifically the cultivation of plants in a vertical format such that vegetation can be grown on walls or in midair from said device, either in a mounted or suspended format. The device can also be useful within aquaculture or hobbyist fishkeeping for the purpose of phytoremediation of nitrogen, phosphorus, and other waste products of the culture of fish and other aquatic organisms.

Description of the Related Art

Hydroponics is the act of growing plants using nutrient-rich water. Plant roots in hydroponics are either continuously or periodically supplied nutrient-rich water with macro and micro plant nutrients in aqueous solution. Aquaponics is similar to hydroponics in that plants rely on nutrient-rich water instead of soil. However in aquaponics, fish and bacteria are added to the hydroponic system. When the fish create waste in the water, the bacteria convert the waste to usable plant nutrients. Both hydroponics and aquaponics allow for plant growth in areas and/or ways not previously possible.

Vertical farming is the act of utilizing multiple levels in a vertical space to grow more plants per square foot and/or grow plants on vertical surfaces that otherwise could not support plants. When either hydroponics or aquaponics are combined with vertical farming, it creates a powerfully space saving and productive system.

SUMMARY OF THE INVENTION

Most prior inventions dealing with vertical hydroponic production are limited to rigid tower or permeable fabric formats, while the described apparatus can be flexible and/or impermeable, allowing for a range of features not found in other devices. The device can be geared towards wall mounted applications, where a scaffolding or support structure from which to hang the apparatus is not necessary. Though, a support structure can also be used.

Most vertical farming/living wall products are heavy, towers, rigid plastic construction, or permeable woven fabric. In contrast, the described apparatus can be modular, collapsible, offer an individual water reservoir for each plant, and/or impermeable. The system according to some embodiments can also function as a moisture barrier and/or insulator.

In some embodiments, a vertically orientated collapsible hydroponic plant production apparatus can include a number of features. For example, it can include a plurality of pockets and a backing. Each pocket of the plurality of pockets can be used to house an individual plant. Each pocket of the plurality can have a water reservoir, an outlet hole at a top of the water reservoir and a channel along a front of the pocket configured to direct water from the outlet hole to another pocket or collection container below the pocket. The plurality of pockets can be connected to the backing in a column or other configuration.

According to some embodiments, an apparatus can be used for the vertically oriented culture of plants using soilless means such as aquaponics or hydroponics. The apparatus can be made of flexible low-density polyethylene thermoformed pockets that are sealed by heat and pressure onto a low density polyethylene backing such that multiple pockets are oriented in offset vertical columns along a single backing. The apparatus can be attached to walls or other support structures to grow plants with minimal foot space usage compared to existing agricultural techniques. When not in use for the production of crops, such as for shipping or storage, the product can be flattened to be collapsed into a roll format.

BRIEF DESCRIPTION OF THE DRAWINGS

Various embodiments are depicted in the accompanying drawings for illustrative purposes, and should in no way be interpreted as limiting the scope of the inventions, in which like reference characters denote corresponding features consistently throughout similar embodiments.

FIG. 15 shows a close up view of the top of an operational embodiment

FIG. 16 shows a top-down wireframe view of an embodiment

FIG. 17 shows an isometric cutaway view of an embodiment

DETAILED DESCRIPTION OF THE PREFERRED EMBODIMENT

Figure 1:
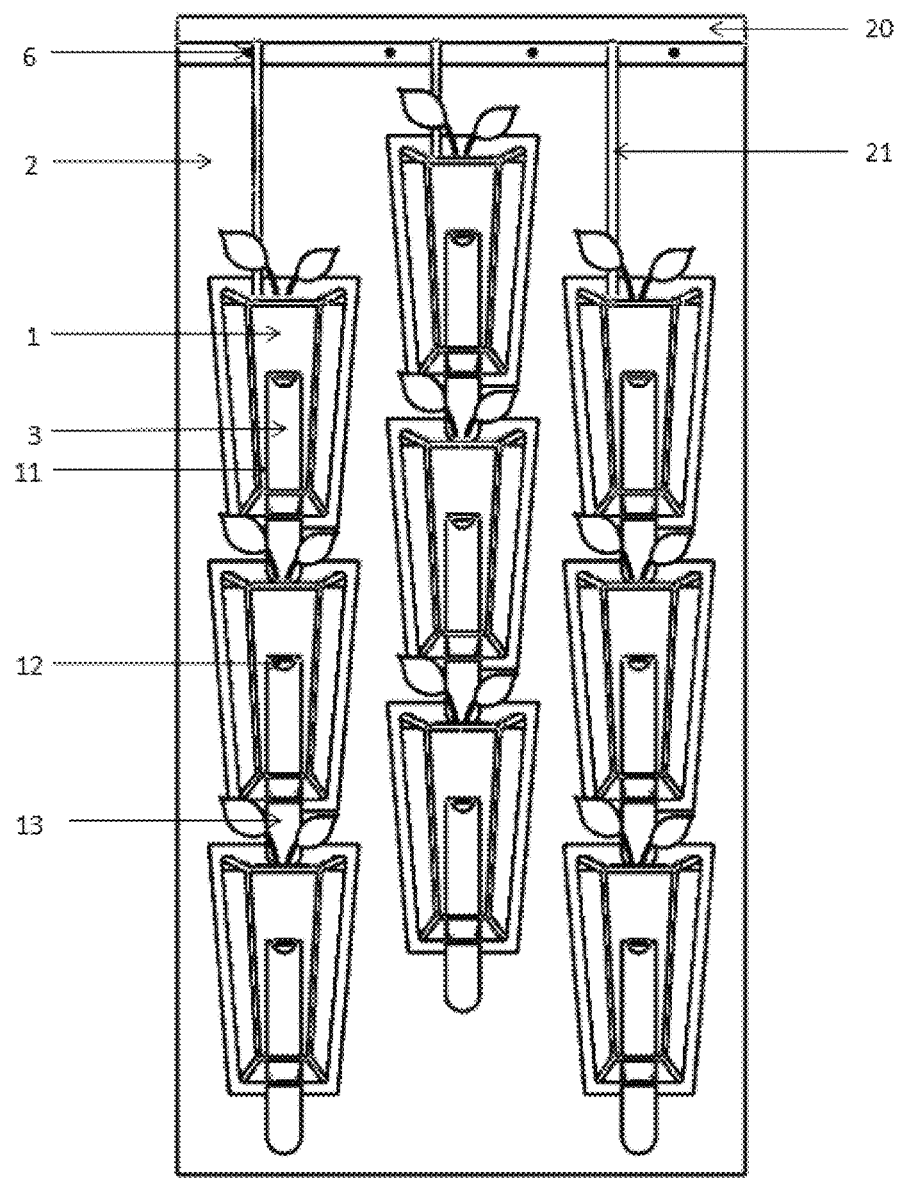
FIG. 1 shows an operational embodiment of the vertical hydroponic apparatus.
Figure 2:
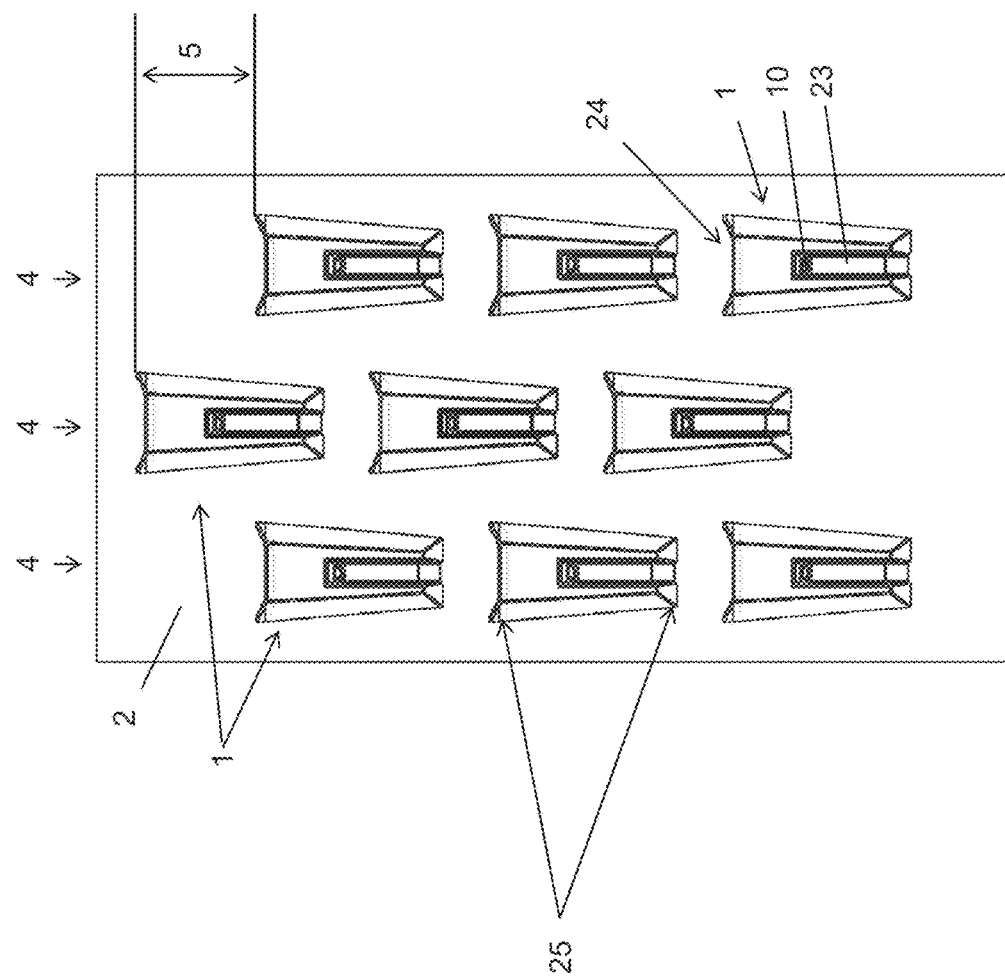
FIG. 2 shows a front view of the vertical hydroponic apparatus.

A vertical hydroponic apparatus will now be described in greater detail. At the most general level, the apparatus is composed of a series of pockets (1, FIG. 1, 2), connected to a flat piece of material which serves as a backing (2, FIG. 1, 2) for the apparatus. As illustrated, the apparatus is composed of a series of trapezoidally shaped pockets (1, FIG. 1, 2), thermoformed from low-density polyethylene ("LDPE"), which are fused to a second flat piece of LDPE which serves as a backing (2, FIG. 1, 2) for the apparatus. The methods used to fuse pieces of the apparatus together, including the "sheaths" (3, FIG. 1) to the pockets, and pockets to the backing, can include heat sealing and impulse sealing, such that watertight seals can be achieved without the use of adhesives or other potentially harmful materials. Pockets (1) can be attached to the backing in any number of configurations. One such configuration, such as that shown includes pockets organized in one or more columns such that the bottom of one pocket is a small number of inches away from the top of the pocket below and so forth, such that all pockets in a single column form a straight line from top to bottom (4, FIG. 2). Three columns (4) are shown in FIG. 2 with 3 pockets (1) each, though other numbers and groupings can be used. Columns constructed in this way can be repeated in a linear horizontal pattern to create a square grid of pockets. Columns can be offset by a height factor such that alternating columns are shifted several inches up or down compared to neighboring columns (5, FIG. 2), which allows plants to fill in the space around pockets more quickly and fully than would be the case using a simple square grid configuration, and providing a more uniform viewing experience for the end user. This spacing can be constant and consistent across rows or it can vary.

Figure 3:
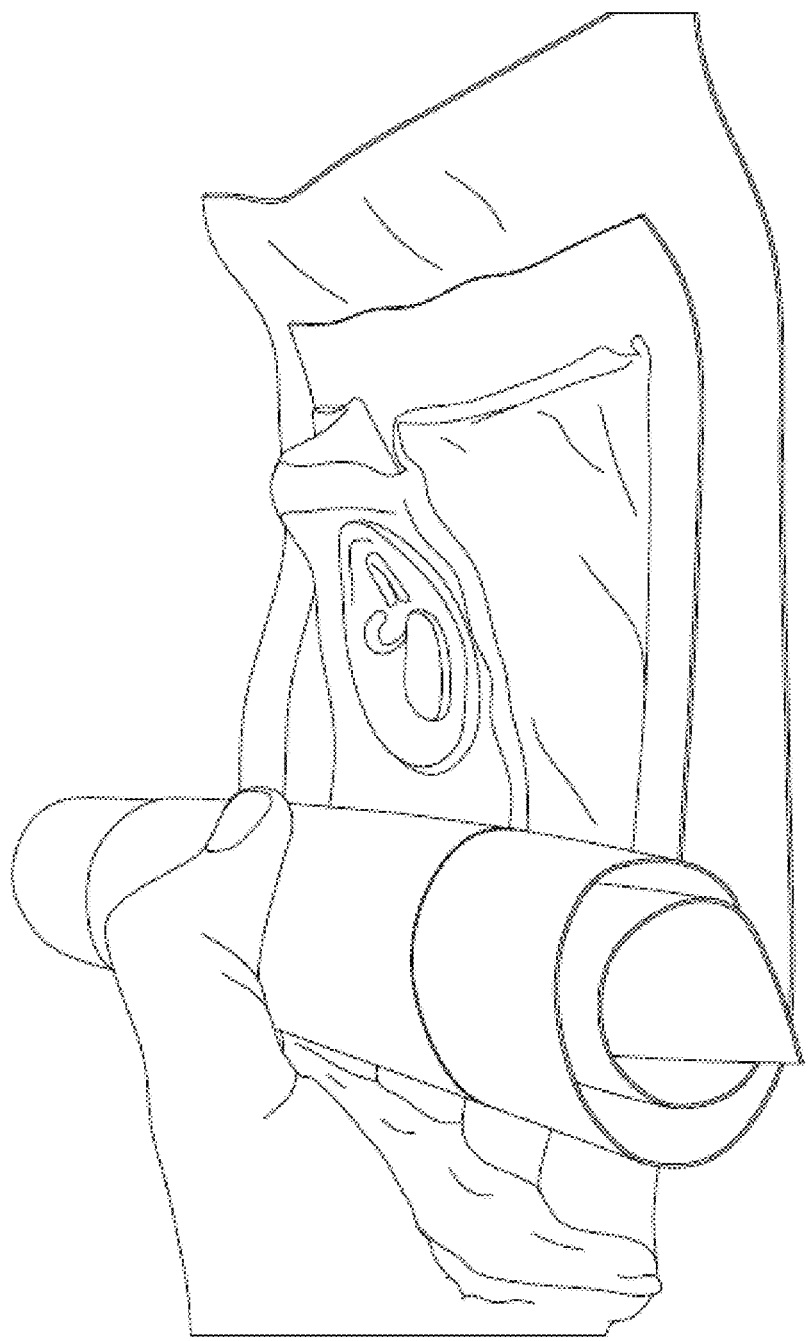
FIG. 3 illustrates a vertical hydroponic apparatus with one pocket in a partially collapsed and rolled state.

Polyethylene or polypropylene are preferred materials for the construction of the apparatus, though other material can be use. Polyethylene and polypropylene are beneficially inert, ensuring no chemicals leach from the plastic into the water. Polyethylene and polypropylene can be made opaque, preventing light from entering the water. Light exposure can cause algae growth, which absorbs valuable nutrients, contributes to clogging, and is an eyesore. Polyethylene and polypropylene are recyclable. Polyethylene and polypropylene are lightweight, meaning almost any surface, including drywall, can support the apparatus, and install is manageable by a single untrained user. Polyethylene and polypropylene are very nearly impermeable, which prevents water damage to structures which support the apparatus, and allow the apparatus to provide insulation to the structures to which they are attached. Polyethylene and polypropylene are flexible, enabling the collapsibility of the product, which makes shipping, storage, and installation of the apparatus less costly, and less cumbersome—the apparatus is likely to be shipped in a compressed format, where the pockets are pressed flat against the backing, and the entire apparatus is rolled in on itself to save space (FIG. 3).

The apparatus, as described above, can be oriented by various methods such that the product can be used in a vertical or inclined orientation. Methods of orienting and affixing the apparatus can include attaching the product to the desired surface by heat sealing a high density plastic header of approximately one inch in height and ⅛ of an inch of thickness to the front of the backing, flush with the top of said backing. Screws or nails (6, FIG. 1, 15) can be driven through the header to affix the apparatus to the desired surface. Alternatively, holes in the header can be used to attach the apparatus to structures such as a chain link fence, or suspend the product in midair by use of string, wire, or cord attached to a support structure of any kind.

Figure 4:
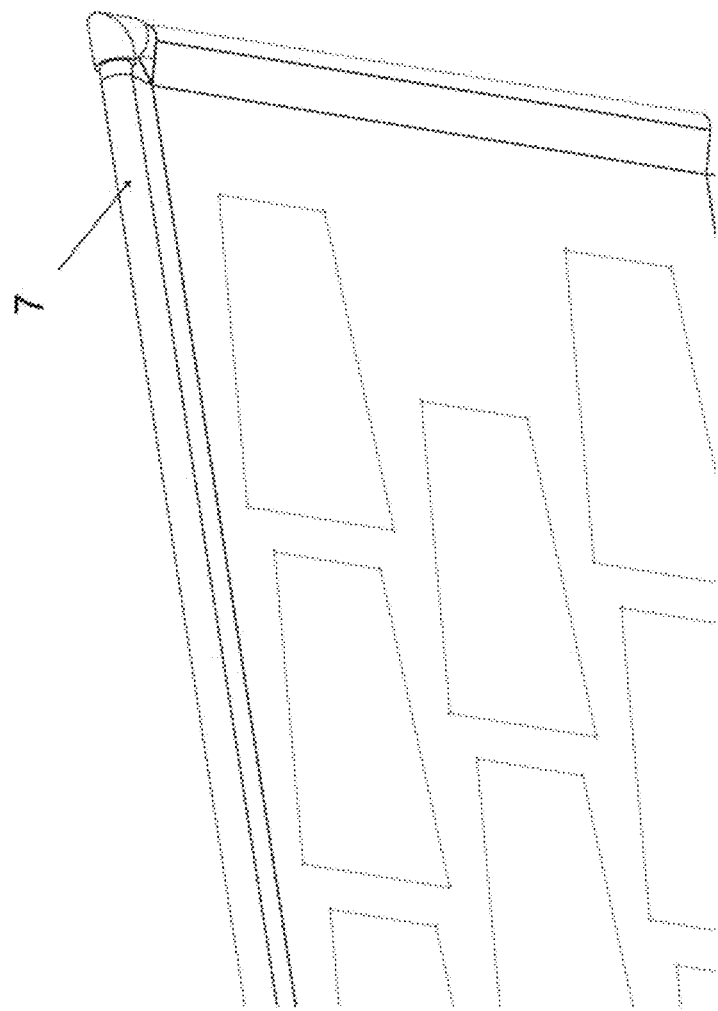
FIG. 4 demonstrates the apparatus' ability to be supported by a pipe or metalwork frame.

Alternatively, the apparatus can be produced with additional space above the first pocket of each column, which can be folded and sealed onto itself such that a loop (7, FIG. 4) is formed that runs the length of the apparatus along the top of its backing. A pipe, or other rigid matter, can be fed through this loop to support the weight of the apparatus. In this way, the apparatus can easily be supported by a PVC or other material frame that is easy for the user to construct and customize to fit individual applications. This format also allows the apparatus to be affixed to A-Frames, enabling the use of the apparatus when wall space or other vertical support structures are unavailable. In this way, the apparatus can be used in a freestanding orientation in a backyard, greenhouse, agricultural field, or temporary location. By removing alternating sections of the aforementioned loop to create interlocking "loop teeth," two apparatus can be supported by the same beam, such that they face opposite directions, forming either a two-sided wall or an A-frame, should space be allowed between the bottoms of said apparatus.

Alternatively, a two-sided adhesive can be applied to the side of the backing which does not house pockets, such that the apparatus might be affixed to a wall or other vertical support structure without the need for tools during installation. This method of affixing the apparatus decreases work for the installer, and allows the product to be used on surfaces where drilling or nailing is not an option.

Figure 5:
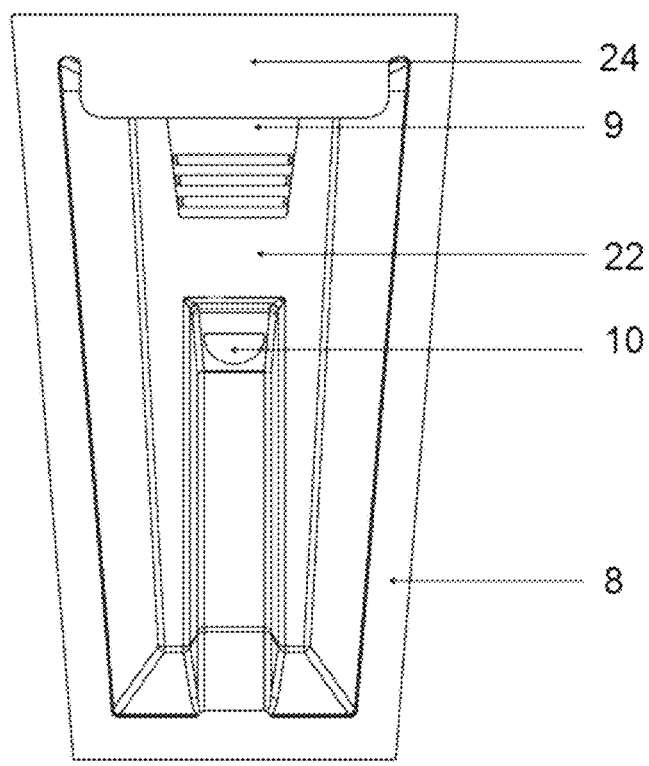
FIG. 5 shows an interior view of a trimmed pocket.
Figure 9:
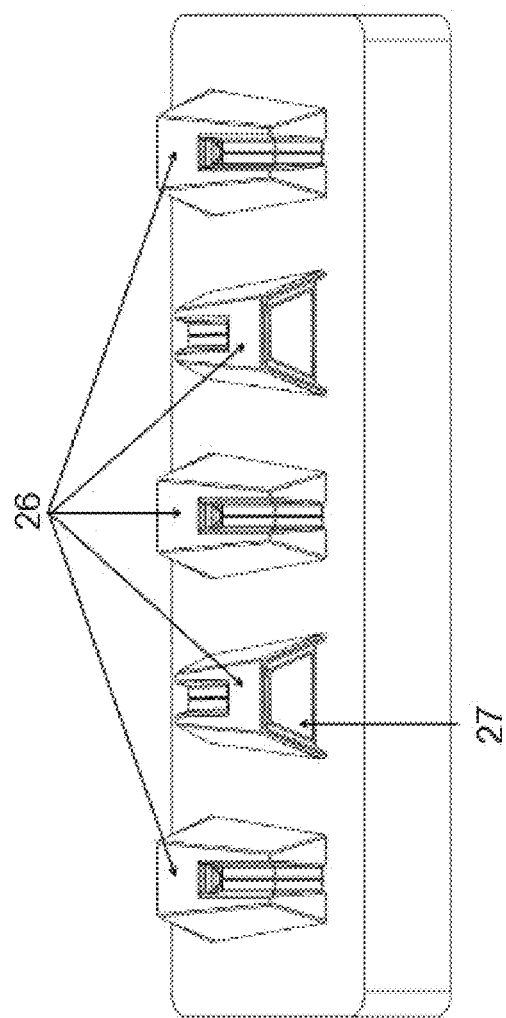
FIG. 9 shows molds and thermoforming equipment that can be used in the construction of the apparatus.
Figure 10:
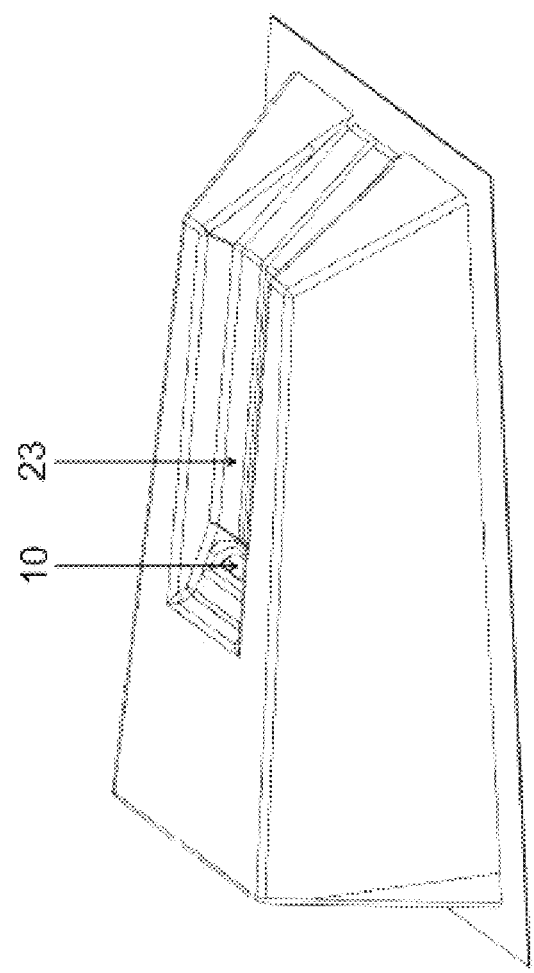
FIG. 10 is an isometric exterior view of a pocket.
Figure 11:
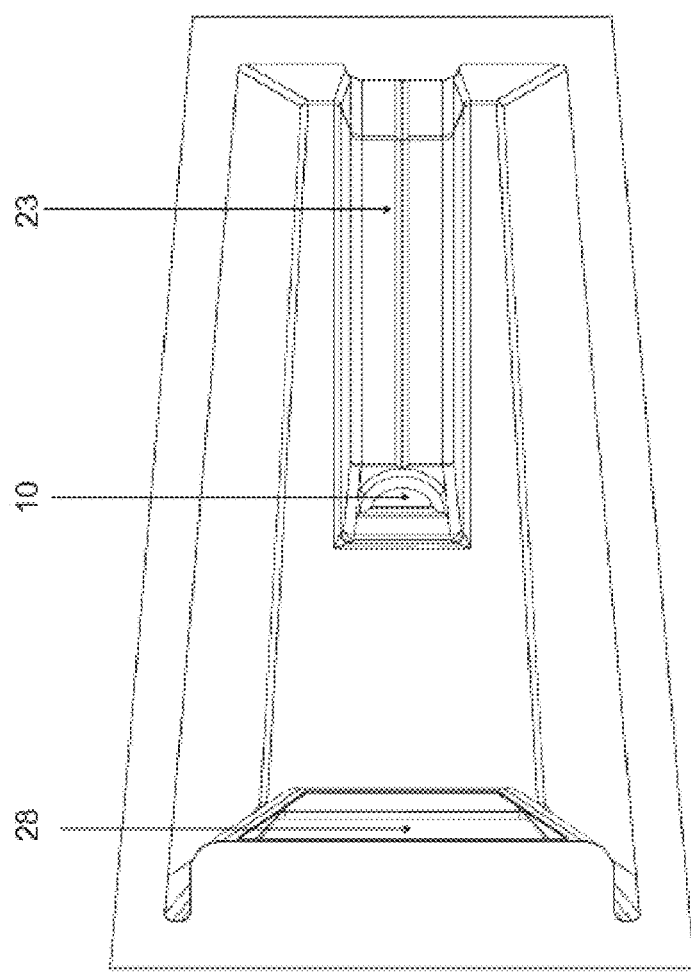
FIG. 11 shows an interior view of a trimmed pocket.
Figure 12:
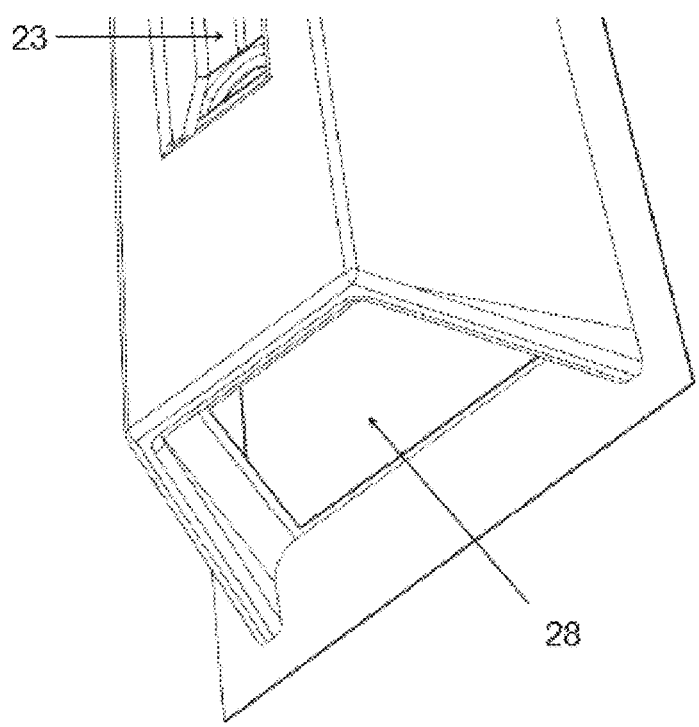
FIG. 12 shows a top-down angled view of a trimmed pocket.
Figure 13:
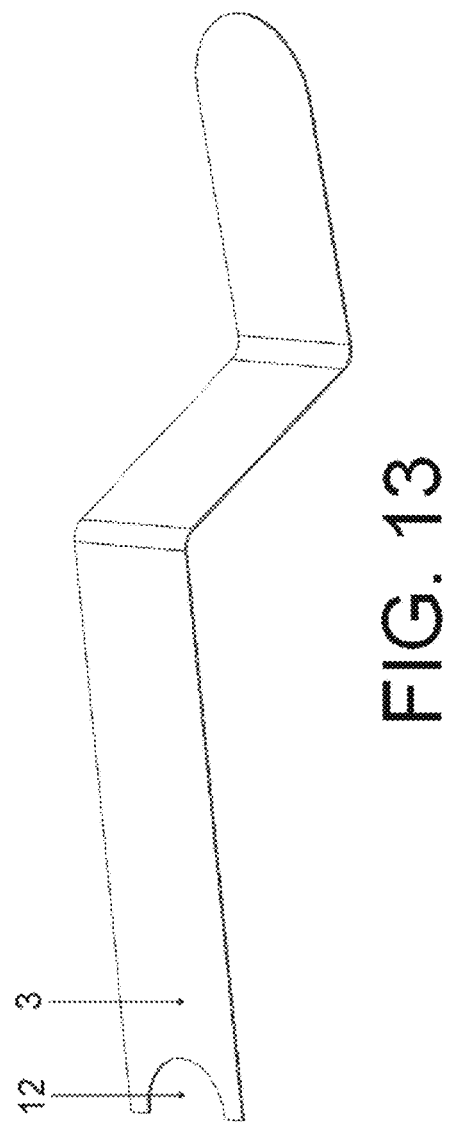
FIG. 13 shows a trimmed sheath before being attached to the apparatus.
Figure 14:
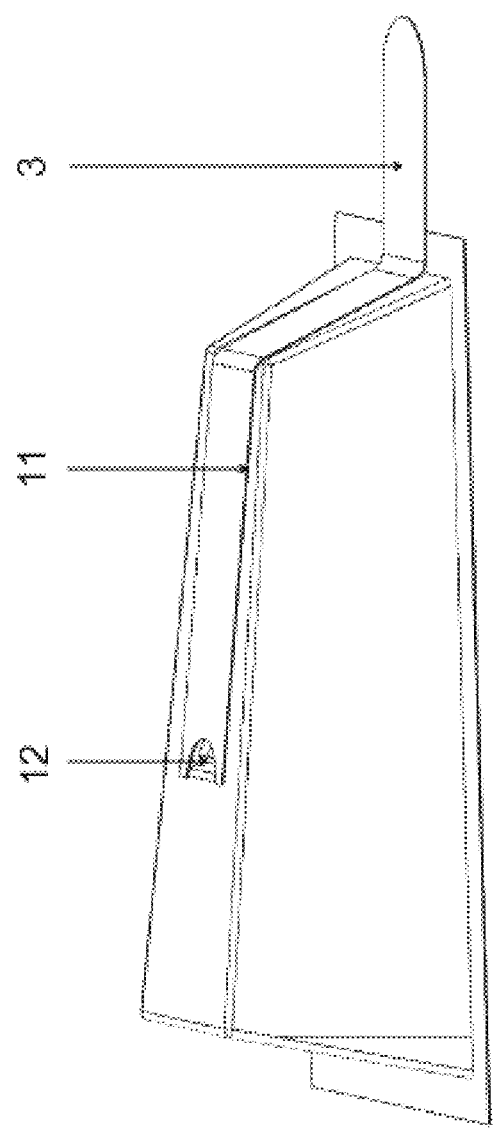
FIG. 14 shows a sheath placed over a pocket before sealing.

The pocket (1) can refer to one of the overall bodies attached to the backing that house the individual plants. The pocket (1) can be vacuum formed bodies and heat sealed to the backing. To form the pockets in the illustrated embodiment, a sheet of plastic is heated in a rectangular frame until it is soft and can be easily manipulated. The plastic is then stretched over one or more heat resistant molds (26, FIG. 9) by pushing a platform with said molds into the heated sheet of plastic. Using a vacuum tank, the air between the platform and plastic is evacuated, pulling the heated plastic sheet over the molds and taking their shape. This sheet with one or more formed pockets can then be trimmed to separate the pockets, such that a roughly half-inch outline (8, FIG. 5) around each pocket is kept to provide a flat surface to contact the flat surface of the backing for sealing. The pocket, preferably before it is sealed to the backing, can have multiple cutouts made, one at the top of the pocket (28, FIG. 11, 12, 17) for the placement of a net pot plant receptacle (9, FIG. 5) and for water to enter, and another cutout is made on the front of the pocket (10, FIG. 5, 10, 11, 17), which acts as an overflow/drain for water to leave the pocket itself. Depressions are formed into the mold's themselves so that cutting guides for these two cutouts are present on each thermoformed pocket (27, FIG. 9, 16, 17).

Once the pocket is trimmed and the cutouts are made, another piece of plastic, referred to as the sheath, (3, FIG. 1, 13, 14) can be heat sealed (or otherwise attached) to the front of the pocket. In some embodiments, only a small area on each vertical side of the sheath makes contact with the pocket (11, FIG. 1, 14), where they are sealed together, allowing space for water to travel behind the sheath and in front of the pocket, along and down the trench. A notch (12, FIG. 1, 13, 14) can be cut at the top of the sheath allowing air to be pulled into the trough. This adds oxygen to the water for the benefit of the live portions of the system, and the air also acts to "air prune" roots, meaning the air acts to stop the growth of roots into the trench, as the roots prefer the dark and moist environment within the pocket. The bottom of the sheath (13, FIG. 1) can extend past the bottom of the pocket, and either into the pocket below or into whatever water collection method is being used in this embodiment. The extended sheath acts to block light from hitting the water as it travels down the backing, preventing the growth of algae and limiting evaporation, while ensuring that wind, plants, or other obstacles do not cause the water to leave the apparatus.

Figure 6:
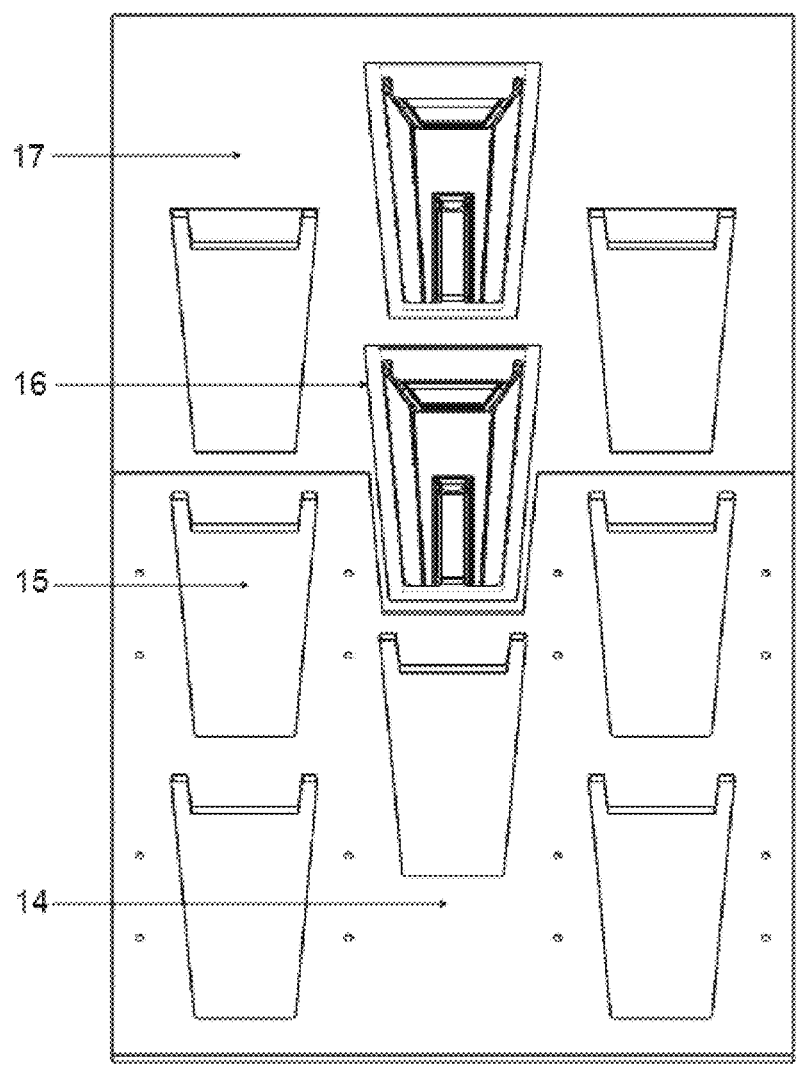
FIG. 6 is a jig that can be used in construction of the apparatus.
Figure 7:
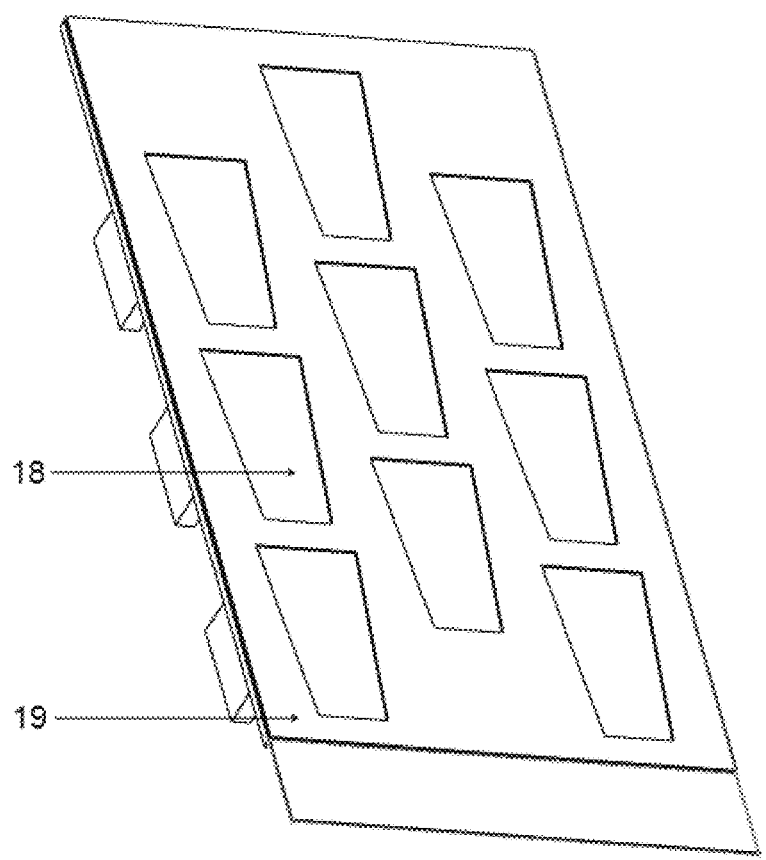
FIG. 7 is a jig that can be used in construction of the apparatus.

In the case where multiple pockets are sealed to the same backing, a jig (14, FIG. 6) can be used to make sure the pockets are sealed in a uniform pattern. The illustrated jig is a flat piece of heat resistant material, raised several inches by support structures with cutouts (15, FIG. 6) such that these cutouts each accept a pocket face down, in pattern reflecting the final pocket layout, with the perimeter of the pocket laying above the jig (16, FIG. 6). A thin layer of heat resistant rubber (17, FIG. 6) rests on top of the metal jig, to achieve a smoother seal. The back plastic sheet, or backing, is placed on the jig, after each cutout has been filled with a pre-trimmed pocket. A sheet of TEFLON or other material which allows heat, but prevents sticking, (18, FIG. 7) is then added to prevent impulse sealers from becoming stuck to the plastic backing. A second jig (19, FIG. 7) is then placed over the TEFLON, which holds all the pieces in place, and guides the impulse sealers to the correct location for each seal such that the product is assembled without the use of any adhesives, and retains a 100% polyethylene construction.

Water can be introduced to the apparatus via a pressurized pipe or tube ("distribution bar") that can run along the top of the product, perpendicular to the orientation of the aforementioned columns (20, FIG. 1, 15), One hole for each column of pockets can be drilled into the distribution bar directly above the top pocket of each column, and a smaller tube or pipe can be inserted into the hole in the distribution pipe on one end and the opening of the top pocket on the other (21, FIG. 1, 15), such that pressurized water exits the distribution bar and enters the top pocket. Both sets of pipes or tubes, the distribution bar, as well as the smaller connectors, are preferably fashioned from opaque plastic or metal, preferably virgin polyethylene or polypropylene such that no or little light passes through the tube. A minimum of light reaching the water minimizes the amount of algae that grows within the irrigation tubes, which in turn minimizes the frequency with which the irrigation system clogs and the amount of time the end user must spend on maintenance activities.

Once water enters a pocket, either from the distribution bar or from the pocket above it, water fills the cavity until the water level reaches the drain hole (10), at which height water begins to drain. The height of said drain hole is slightly lower than the bottom of the net pot that holds the plant, such that roots growing out of the net pot grow through a section of air before reaching the reservoir of water and becoming submerged (22, FIG. 5). Water splashes in this "air zone" providing moisture for roots, but also ensuring constant exposure to air. In this way, an established root mass will have portions that are mainly dry and absorbing oxygen, as well as portions that are constantly submerged and absorbing nutrients. This reservoir of water is individual for each plant, ensuring that the plant will not die immediately in the case of electrical or pump failure. This feature also enables watering to happen on timed intervals, continuously, or at will, without significant risk of the plant dying. Having individual reservoirs also prevents roots from different plants from mingling, which would otherwise add difficulty to the acts of harvesting and replanting as well as the possibility of damaging the roots, while preserving the ability to harvest plants live-root.

Figure 8:
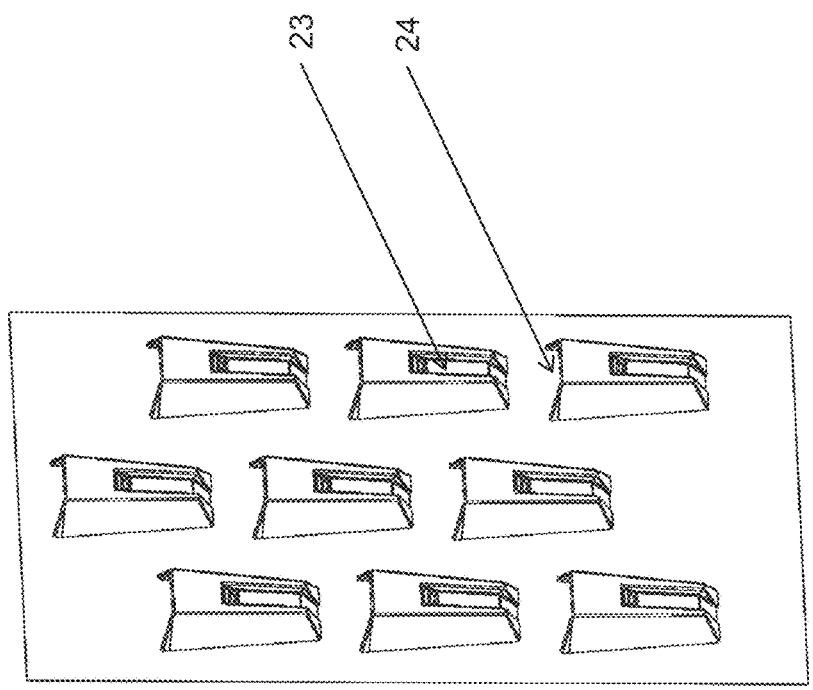
FIG. 8 is an isometric view of one embodiment of the apparatus.

The drain hole can be oversized compared to the minimum size it would need to be to pass water, in order to accommodate aquaculture solids, or a few stray roots, without clogging. The water travels from the reservoir, through the drain hole, and into a trough or trench formed into the front of the pocket (23, FIG. 8, 10, 11, 12, 17). A heat sealed piece of plastic can be used to cover the trough referred to as a sheath. Water travels all the way down the space between the trough and sheath and out the bottom of the pocket. The water then travels down the backing and into the top of the next pocket in the column. The top of the pocket can have a recessed area (24, FIG. 5, 8) to direct water into an opening, such as the opening with the net pot. The cutout on the top of the pocket can leave enough material on the top of the pocket to direct incoming water to the side of the net pot; ensuring roots are in contact with the water. Water can then travel through the second pocket and the remaining pockets in the column in the same fashion as the first pocket. Once water exits the bottom pocket in the column, it either free flows down the backing and into a reservoir, fish tank or collection basin, or the bottom of the backing is curled up in such a way that it forms a gutter, which directs water into a pipe that is connected to the overall system, so the water can be directed at will and recirculated.

In some embodiments that pocket can have a trapezoidal shape. For example the bottom of the trapezoid can be smaller than the top and the sides can be same sized. The overall trapezoidal shape of the pocket works to redirect any water that may overflow out of the top of the pocket, in the case of the drain hole clogging, and keep the water in circulation. If the water overflows and travels out the top of the pocket the water will travel along the pocket front and sides due to gravity and the surface adhesion properties of water, (25, FIG. 2) and once it reaches the bottom of the pocket, it rejoins the normal path of the water and travels into the top of the pocket below it, or into a reservoir or gutter system, where the water is collected and pumped back to the top of the apparatus forming a recirculating system. Recirculating systems allow no water to be lost to groundwater seepage or runoff, and are therefore much more water efficient than soil based farming and gardening systems.

In cases where the apparatus is connected to an aquarium, aquaculture system, or aquaponics system, the apparatus enables phytoremediation of the water by removing nitrogen, phosphorus, and other fish waste products. This reduced waste load means less maintenance, fewer water changes (and therefore less water usage), and a significant reduction in cost of operation at scale, since large aquaculture operations typically pay for waste removal, and can now use that waste to fuel an additional revenue source.

The described apparatus can be manufactured, sold, and used on a single pocket basis, in panels of set number and arrangement of pockets, or in a continuous sheet or roll format, depending on the use case of the end user. This modularity and flexibility allows for the design and construction of atypically shaped living walls, there is no restriction to a rectilinear layout.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A vertically orientated collapsible hydroponic plant production apparatus comprising:
   a plurality of pockets, each configured to house an individual plant without the use of growing media, each pocket of the plurality having:
      an air zone disposed below a proximal end of the pocket, the air zone configured to receive a root of the plant therethrough;
      a water reservoir disposed below the air zone, the water reservoir configured to receive the root of the plant therein after it passes through the air zone;
      an outlet hole at a top of the water reservoir and defined on a front surface of the pocket below the proximal end of the pocket, the outlet hole in communication with the air zone in the pocket and defining a water level of the water reservoir; and
      a channel defined along the front surface of the pocket and extending from the outlet hole toward a distal end of the pocket, the channel configured to direct water from the outlet hole to another pocket or collection container below the pocket; and
   a collapsible backing panel of flexible material, each of the plurality of pockets connected to the backing in at least one column.

2. The apparatus of claim 1, wherein the backing panel is impermeable.

3. The apparatus of claim 1, wherein at least one of the plurality of pockets is made of polyethylene or polypropylene.

4. The apparatus of claim 1, wherein the backing panel is made of polyethylene or polypropylene.

5. The apparatus of claim 1, wherein the backing panel is configured to be rolled for storage or shipping.

6. The apparatus of claim 1, wherein the plurality of pockets are arranged in one or more columns on the backing panel, with at least one of the plurality of pockets spaced above another of the plurality of pockets.

7. The apparatus of claim 1, wherein each of the plurality of pockets further comprises a plant receptacle configured to receive a plant, the receptacle configured to at least partially extend though an opening at a proximal end of the pocket so that a distal portion of the receptacle extends into the air zone and is disposed above the water reservoir.

8. The apparatus of claim 7, wherein the receptacle has a plurality of openings through which roots of the plant can extend into the air zone and the water reservoir.

9. The apparatus of claim 1, further comprising a cover attachable to the front surface of the pocket so that it covers at least a portion of the channel.

10. A vertically orientated collapsible hydroponic plant production apparatus comprising:
    a plurality of pockets, each configured to house an individual plant without the use of growing media, each pocket of the plurality having:
       an air zone disposed below a proximal end of the pocket, the air zone configured to receive a root of the plant therethrough;
       a water reservoir disposed below the air zone, the water reservoir configured to receive the root of the plant therein after it passes through the air zone;
       an outlet hole at a top of the water reservoir and defined on a front surface of the pocket below the proximal end of the pocket, the outlet hole in communication with the air zone in the pocket and defining a water level of the water reservoir;
       a channel defined along the front surface of the pocket and extending from the outlet hole toward a distal end of the pocket, the channel configured to direct water from the outlet hole to another pocket or collection container below the pocket; and
       a sheath cover disposed over the channel to inhibit sunlight from shining on water flowing through the channel to thereby inhibit one or both of water evaporation and algae growth; and
    a collapsible backing panel of flexible material, each of the plurality of pockets connected to the backing in at least one column.

11. The apparatus of claim 10, wherein the backing panel is impermeable.

12. The apparatus of claim 10, wherein at least one of the plurality of pockets is made of polyethylene or polypropylene.

13. The apparatus of claim 10, wherein the backing panel is made of polyethylene or polypropylene.

14. The apparatus of claim 10, wherein the backing panel is configured to be rolled for storage or shipping.

15. The apparatus of claim 10, wherein the plurality of pockets are arranged in one or more columns on the backing panel, with at least one of the plurality of pockets spaced above another of the plurality of pockets.

16. The apparatus of claim 10, wherein each of the plurality of pockets further comprises a receptacle configured to receive a plant, the receptacle configured to at least partially extend though an opening at a proximal end of the pocket so that a distal portion of the receptacle extends into the air zone and is disposed above the water reservoir.

17. The apparatus of claim 16, wherein the receptacle has a plurality of openings through which roots of the plant can extend into the air zone and the water reservoir.

* * * * *